(12) United States Patent  (10) Patent No.: US 7,516,371 B2
Sakaue et al.  (45) Date of Patent: Apr. 7, 2009

(54) ECC CONTROL APPARATUS

(75) Inventors: Kenji Sakaue, Yokohama (JP); Hiroshi Sukegawa, Tokyo (JP); Hitoshi Tsunoda, Futtsu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 558 days.

(21) Appl. No.: 10/787,183

(22) Filed: Feb. 27, 2004

(65) Prior Publication Data

US 2004/0205418 A1   Oct. 14, 2004

(30) Foreign Application Priority Data

Feb. 28, 2003 (JP) ............... 2003-054686
Jan. 23, 2004 (JP) ............... 2004-016180

(51) Int. Cl.
    *G06F 11/00* (2006.01)
(52) U.S. Cl. ........................ 714/52; 714/763
(58) Field of Classification Search ............ 714/52, 714/763
    See application file for complete search history.

(56) References Cited

U.S. PATENT DOCUMENTS

| 4,238,524 | A |   | 12/1980 | LaLiberte et al. |
| 4,303,701 | A |   | 12/1981 | Torgersen et al. |
| 4,307,149 | A |   | 12/1981 | Scott et al. |
| 4,329,378 | A |   | 5/1982  | Tarumi et al. |
| 5,135,591 | A |   | 8/1992  | Vockel, Jr. et al. |
| 5,194,289 | A |   | 3/1993  | Butland |
| 5,279,058 | A |   | 1/1994  | Kohn |
| 5,421,869 | A |   | 6/1995  | Gundjian et al. |
| 5,516,362 | A |   | 5/1996  | Gundjian et al. |
| 5,559,956 | A |   | 9/1996  | Sukegawa |
| 5,599,578 | A |   | 2/1997  | Butland |
| 5,603,001 | A |   | 2/1997  | Sukegawa et al. |
| 5,605,738 | A |   | 2/1997  | McGinness et al. |
| 5,673,383 | A |   | 9/1997  | Sukegawa |
| 5,811,152 | A |   | 9/1998  | Cleary |
| 5,958,079 | A | * | 9/1999  | Yoshimura ............... 714/766 |
| 5,961,660 | A | * | 10/1999 | Capps et al. ............. 714/763 |

(Continued)

FOREIGN PATENT DOCUMENTS

JP    2000-349652    12/2000

OTHER PUBLICATIONS

U.S. Appl. No. 10/787,181, filed Nov. 25, 2003, Rodriguez.

(Continued)

*Primary Examiner*—Robert Beausoliel
*Assistant Examiner*—Philip Guyton
(74) *Attorney, Agent, or Firm*—Oblon, Spivak, McClelland, Maier & Neustadt, P.C.

(57) ABSTRACT

An ECC control apparatus is to be connected between a host and a memory. The apparatus comprises a first input/output circuit, a detecting circuit, a code-generating circuit, a code-inserting circuit, a second input/output circuit. The first input/output circuit inputs and outputs data to and from the host. The detecting circuit detects a protected-data region and a redundant region of write data input to the first input/output circuit and having a predetermined data length. The code-generating circuit generates an error-correction code for correcting errors in data stored in the protected-data region. The code-inserting circuit inserts the error-correction code in the redundant region. The second input/output circuit inputs and outputs data to and from the memory.

22 Claims, 7 Drawing Sheets

U.S. PATENT DOCUMENTS

| | | | | |
|---|---|---|---|---|
| 6,058,047 A * | 5/2000 | Kikuchi | ................. | 365/185.33 |
| 6,263,399 B1 * | 7/2001 | Hwang | ....................... | 711/103 |
| 6,339,546 B1 * | 1/2002 | Katayama et al. | ...... | 365/185.09 |
| 6,349,390 B1 * | 2/2002 | Dell et al. | ...................... | 714/6 |
| 6,608,784 B2 * | 8/2003 | Kanamori et al. | ........... | 365/200 |
| 6,684,353 B1 * | 1/2004 | Parker et al. | ................. | 714/718 |
| 6,701,480 B1 * | 3/2004 | Karpuszka et al. | .......... | 714/764 |
| 6,813,184 B2 * | 11/2004 | Lee | ....................... | 365/185.09 |
| 6,985,778 B2 * | 1/2006 | Kim et al. | .................... | 700/17 |
| 7,028,248 B2 * | 4/2006 | Chen et al. | .................. | 714/785 |
| 7,076,722 B2 * | 7/2006 | Shibata | ....................... | 714/763 |
| 7,096,406 B2 * | 8/2006 | Kanazawa et al. | .......... | 714/763 |
| 7,114,117 B2 * | 9/2006 | Tamura et al. | .............. | 714/763 |

OTHER PUBLICATIONS

Organic Products Company Brochure, 6 pages; Material Safety Data Sheets, 2 pages.

\* cited by examiner

ECC CONTROL APPARATUS

CROSS-REFERENCE TO RELATED APPLICATIONS

This application is based upon and claims the benefit of priority from prior Japanese Patent Applications No. 2003-054686, filed Feb. 28, 2003; and No. 2004-016180, filed Jan. 23, 2004, the entire contents of both of which are incorporated herein by reference.

BACKGROUND OF THE INVENTION

1. Field of the Invention

The present invention relates to an ECC (Error Check and Correct) control apparatus for use in storing data output from a host into a memory and reading data from the memory to the host. More particularly, it relates to an ECC control apparatus of the type that is provided on a bus connecting a host and a memory.

2. Description of the Related Art

The number of levels of data, which one memory cell can store, may be changed from two to three or more (multi-level). Then, memory cards using memory cells used as storage elements can have their data storage capacity increased. In a memory card having memory cells that store multi-level data, the memory cells deteriorate as they keep holding the data for a long time or as data is repeatedly written to and read from them. As a consequence, the data stored in the memory card more decreases in terms of reliability than the data stored in memory cards that store binary data.

Memories with a new error-correcting means have been proposed, in which the memory cells are prevented from deteriorating. (Such a memory is disclosed in, for example, Jpn. Pat. Appln. KOKAI Publication 2000-349652.)

To incorporate an error-correcting means into the memory provided in a memory card, however, it is necessary to re-design the circuits used in the memory card or in the host that writes data into the memory card. If the circuits in the host are changed in design, the host will need to process more data to control the error-correcting means.

BRIEF SUMMARY OF THE INVENTION

An ECC control apparatus according to an aspect of this invention is to be connected between a host and a memory. The ECC control apparatus comprises: a first input/output circuit which inputs and outputs data to and from the host; a detecting circuit which detects a protected-data region and a redundant region of write data input to the first input/output circuit and having a predetermined data length; a code-generating circuit which generates an error correction code for correcting errors in the data stored in the protected-data region; a code inserting circuit which inserts the error-correction code in the redundant region; and a second input/output circuit which inputs and outputs data to and from the memory.

DETAILED DESCRIPTION OF THE INVENTION

An embodiment of the present invention will be described, with reference to the accompanying drawings.

Figure 1:
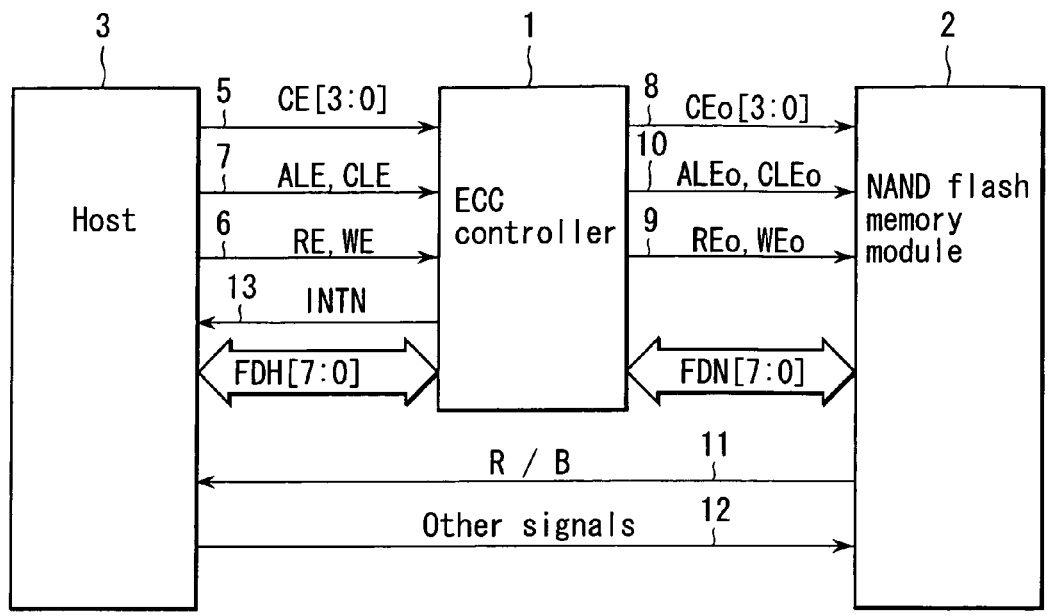
FIG. 1 is a block diagram showing an embodiment of this invention in its entirely.

FIG. 1 is a block diagram that shows the embodiment in its entirely.

In the embodiment, NAND flash memories, for example, are used as memory cards. The embodiment incorporates a NAND flash memory module 2 that comprises four NAND flash memories. A host 3 is, for example, a NAND memory control apparatus which comprises a NAND memory interface circuit. It may be, for example, a personal computer which writes and reads data into and from the NAND flash memory module 2. An ECC controller 1 is provided between the NAND flash memory module 2 and the host 3. More precisely, the ECC controller 1 interrupts and is inserted in the bus that connects the NAND flash memory module 2 to the NAND memory interface circuit incorporated in the host 3.

The ECC controller 1 and the host 3 are connected by a data bus FDH[7:0] (hereinafter called "bus FDH"), a chip-enable signal line 5 (hereinafter called "CE signal line"), a signal line 6, a signal line 7, and signal line 13. The bus FDH is an 8-bit bidirectional bus. The CE signal line 5 supplies a 4-bit chip-enable (CE) signal. The signal line 6 supplies a read-enable (RE) signal and a write-enable (WE) signal. The signal line 7 supplies an address-latch-enable (ALE) signal and a command-latch-enable (CLE) signal. The signal line 13 supplies an interruption (INTN) signal.

The host 3 outputs commands, addresses and write data to the bus FDH. Thus, the commands, addresses and write data can be supplied to the module 2. The host 3 reads read data, the status data of the module 2, and the like from the module 2 through the bus FDH. The host 3 reads error correction data and the like, too, from the ECC controller 1 through the bus FDH.

The CE signal indicates that the host 3 is accessing the module 2. The RE signal shows that the host 3 is reading data from the module 2. The WE signal indicates that the host 3 is writing data into the module 2. The ALE signal indicates that the host 3 is transferring address data to the module 2. The CLE signal shows that the host 3 is transferring command data to the module 2. The CE signal, RE signal and WE signal are active at, for example, low level. The ALE signal and the CLE signal are active at, for example, high level.

The ECC controller 1 and the NAND flash memory module 2 are connected by a data bus FDN[7:0] (hereinafter called "bus FDN"), a signal line 8, a signal line 9, and a signal line 10. The bus FDN is an 8-bit bidirectional bus. The signal line 8 is a 4-bit line for supplying a chip-enable (CE[3:0]) signal (hereinafter called "CEo signal"). The signal line 9 supplies a read-enable signal (REo) and a write-enable signal (WEo). The signal line 10 supplies an address-latch-enable signal (ALEo) and a command-latch-enable signal (CLEo). The various enable signals output from the ECC controller 1 have been generated from enable signals output from the host 3. How they are generated will be described later.

Signal lines 11 and 12 connect the module 2 and the host 3. The signal line 11 supplies a ready/busy (R/B) signal. The signal line 12 transfers other signals. The signals shown as "other signals" in FIG. 1 are those that do not change no matter whether the ECC controller 1 is provided or not. The R/B signal can be at high level to indicate that the module 2 is ready, and at low level to indicate that the module 2 is busy. To read data from the module 2, the host 3 issues a read command to the module 2. In response to the read command, the module 2 becomes ready. Then, the host 3 can read data from the module 3.

The host 3 writes data into the module 2 in the following way. First, the host 3 uses a WE signal, writing data into the data buffer incorporated in the module 2. Next, the host 3 executes a program command (i.e., a command for writing data from the data buffer to the memory cells). Once the program command has been executed, the module 2 sets the R/B signal to low level, thus informing the host 3 that it is busy executing a program. Further, the module 2 sets the R/B signal to high level, informing that it is ready to store next data that the host 3 may supply to it.

Figure 2:
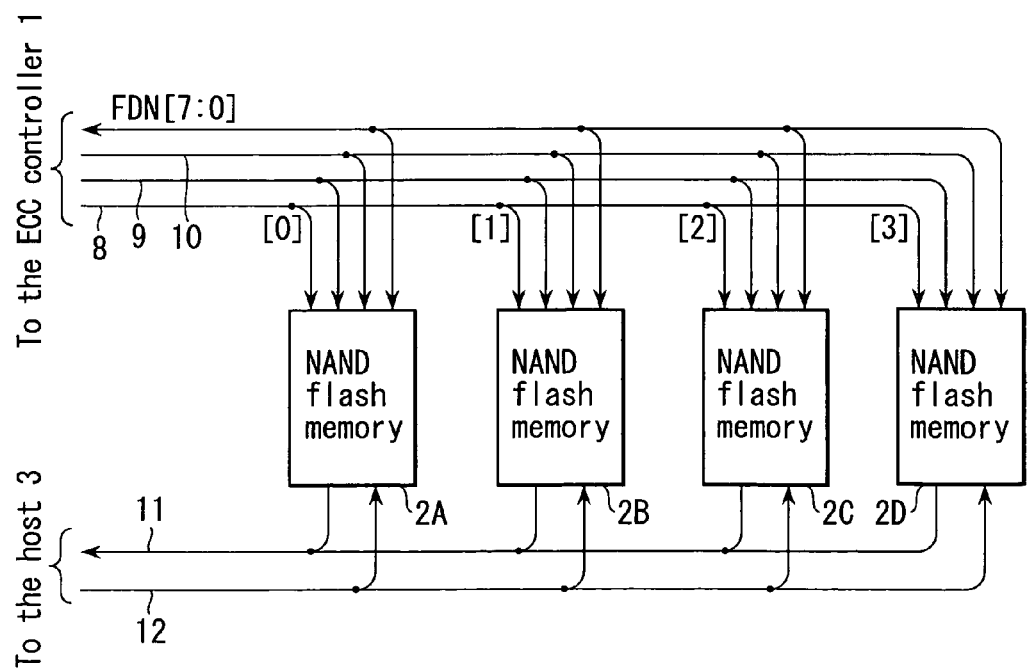
FIG. 2 is a block diagram illustrating the internal structure of the NAND flash memory module 2 shown in FIG. 1.

FIG. 2 is a block diagram illustrating the internal structure of the NAND flash memory module 2 shown in FIG. 1. The NAND flash memory module 2 has, for example, four NAND flash memories 2A, 2B, 2C and 2D. Each NAND flash memory is connected to the 8-bit bidirectional data bus FDN [7:0], the signal line 9 that supplies signals REo and WEo, the signal line 10 that supplies signals ALEo and CLEo and the signal line 12 that transfers the other signals. From the 4-bit signal line 8 (CEo[3:0]), bits CEo[0], CEo[1], CEo[2] and CEo[3] are supplied to the NAND flash memories 2A, 2B, 2C and 2C, respectively. The signal line 11, which supplies the 1-bit R/B signals output from the NAND flash memories 2A to 2D, is connected to the host 3. A wired logic is used as a control system of the R/B signal.

The number of NAND flash memories provided is not limited to four. Rather, it can be changed in accordance with the number of bits that constitute the CEo signal. Of the four bits of the CEo signal, the 0th bit is assigned to the NAND flash memory 2A, the first bit to the NAND flash memory 2B, the second bit to the NAND flash memory 2C, and the third bit to the NAND flash memory 2D. Each NAND flash memory starts operating when the bit assigned to it become active. The NAND flash memories 2A to 2D operate in the same way. For simplicity, the operation of only the NAND flash memory 2A (called "NAND memory" hereinafter) will be described.

Figure 3:
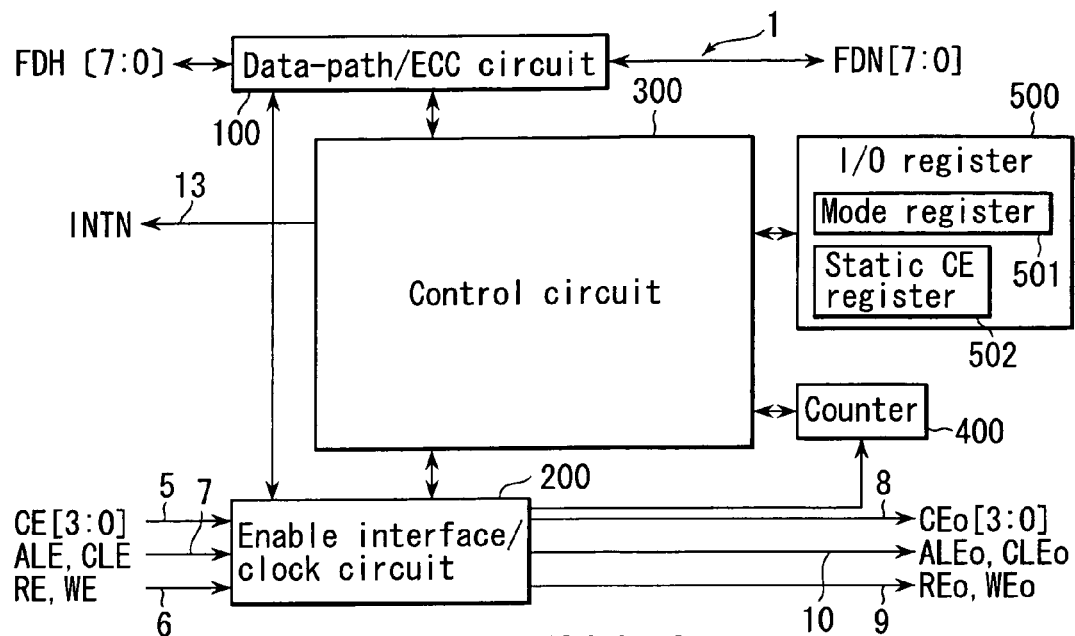
FIG. 3 is a block diagram depicting the internal structure of the ECC controller 1 shown in FIG. 1.

FIG. 3 is a block diagram depicting the internal structure of the ECC controller 1. The ECC controller 1 has a data-path/ECC circuit 100, an enable interface/clock circuit 200, a control circuit 300, a counter 400, and an I/O register 500. The data-path/ECC circuit 100 (hereinafter referred to as "DP/ECC circuit") performs a data-path process on write data and read data, generates ECD codes, corrects errors and effects some other processes. The enable interface/clock circuit 200 (hereinafter referred to as "EI/C circuit") adjusts the delay time of each enable signal, generates a clock signal and performs some other processes. The counter 400 counts the bits that constitute the write data or read data and the pulses that constitute the RE signal or WE signal. The I/O register 500 stores the data input from the host 3.

Figure 4:
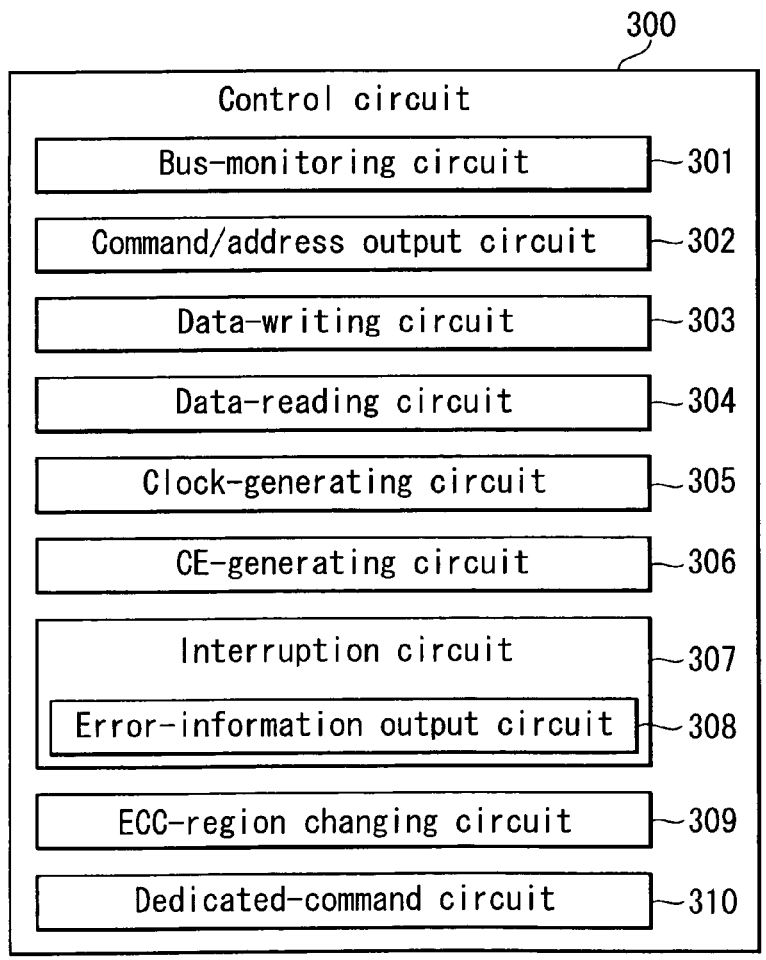
FIG. 4 is a block diagram of the control circuit 300 shown in FIG. 3.

FIG. 4 is a block diagram of the control circuit 300. The control circuit 300 generates control signals that the DP/ECC circuit 100 and the EI/C circuit 200 uses to perform processes. The control signals are output to the DP/ECC circuit 100 and EI/C circuit 200. The control circuit 300 has a bus-monitoring circuit 301, a command/address output circuit 302, a data-writing circuit 303 and a data-reading circuit 304.

The bus-monitoring circuit 301 monitors the data being supplied through the buses FDH and FDN. If no data is being input or output from the ECC controller 1, no data is output to the bus FDH or the bus FDN. This is because the bus-monitoring circuit 301 generates control signals NOUTE and HOUET, which are input to the tri-state buffers 106 and 111 that are provided in the DP/ECC circuit 100. (The buffers 106 and 11 will be described later in connection with FIG. 6). Thus, the ECC controller 1 provided on the bus that connects the module 2 to the host 3 outputs no unnecessary data, preventing the host 3 and the NAND memory 2A from malfunctioning.

The command/address output circuit 302 performs controls to detect the commands and addresses output from the host 3 and to transfer the commands and addresses to the NAND memory 2A. The circuit 302 generates various control signals. The control signals are output to the DP/ECC circuit 100.

The data-writing circuit 303 controls the writing of the write data and ECC codes. The circuit 303 uses the counter 400, which counts the bytes constituting data block, thereby to insert ECC codes into the data block at precise timing. The circuit 303 also generates various control signals. These control signals are output to the DP/ECC circuit 100, too.

The data-reading circuit 304 controls the reading of read data. The circuit 304 controls a correction circuit 114 and the like, which correct errors. The circuit 304 transfers the data generated by the correction circuit 114, to the host 3. It generates various control signals. These control signals are output to the DP/ECC circuit 100.

The control circuit 300 further has a clock-generating circuit 305, a CE-generating circuit 306, an interruption circuit 307, an ECC-region changing circuit 309, and a dedicated-command circuit 310.

The clock-generating circuit 305 switches the substituted WE/RE clock mode. The circuit 305 also controls the generation of the clock signal in the substituted WE/RE clock mode. The clock-generating circuit 305 can operate in the ordinary clock mode and the substituted WE/RE clock mode. In the ordinary clock mode, the clock-generating circuit 305 uses the clock signal it has acquired from the host 3. In the substituted WE/RE clock mode, the clock-generating circuit 305 uses an RE signal or a WE signal as clock (CLK) signal to generate a clock signal (CLK) that is required to operate the ECC controller 1. In the substituted WE/RE mode, the clock-generating circuit 305 can mask, at a precise timing, the RE and WE signals unnecessary in the NAND memory 2A, by utilizing the count made by the counter 400.

The CE-generating circuit 306 controls the operating mode of the ECC controller 1. The ECC controller 1 operates in a dynamic CE mode and a static CE mode. In the dynamic CE mode, the ECC controller 1 outputs a CEo signal in accordance with the CE signal input from the host 3. In the static CE mode, the ECC controller 1 outputs the chip enable signal written in the I/O register 500. The CE-generating circuit 306 switches the operating mode, from the dynamic CE mode to the static CE mode, or vice versa. The CE-generating circuit 306 outputs a static CE signal to the NAND memory 2A when the static CE mode is selected.

The interruption circuit 307 makes the interruption signal active, thus effecting interruption control. The interruption circuit 307 has an error-information output circuit 308. At the same time, the interruption circuit 307 makes the interruption signal active, the error-information output circuit 308 outputs data to the host 3. The data output represents the result of the error correction that the correction circuit 114 performs as will be described later in connection with FIG. 6.

The ECC-region changing circuit 309 changes the position at which the ECC code generates by the ECC controller 1 is to be inserted. The circuit 309 changes the position in accordance with a data format that will be described later. The changing circuit 309 controls the timing of inserting the ECC code. It generates a control signal NDOS at this timing.

The dedicated-command circuit 310 detects a command output from the host 3 and dedicated for the ECC controller 1. When the dedicated-command circuit 310 detects this command, it prevents any command input thereafter from the host 3 from being output to the NAND memory 2A.

Figure 5:
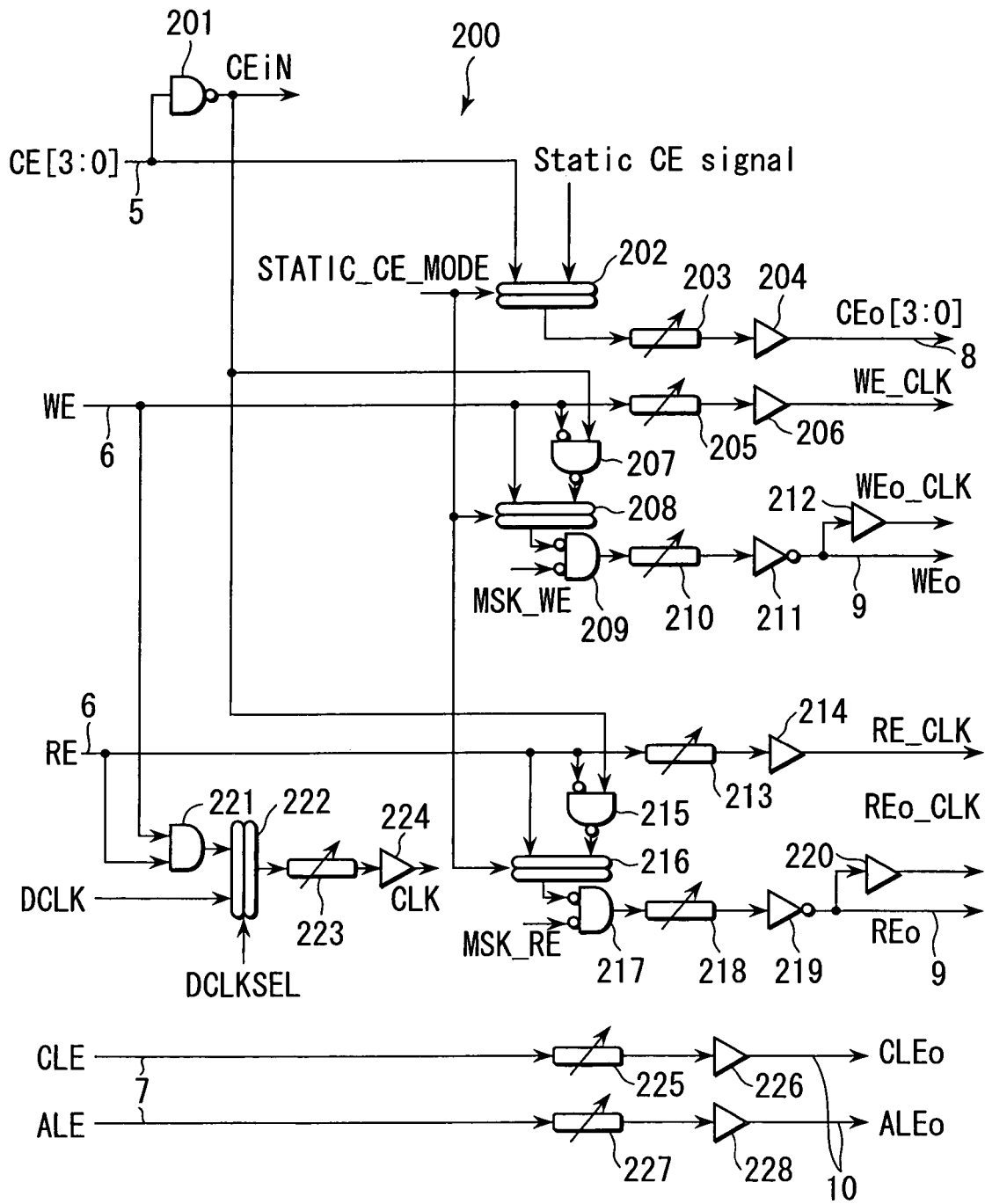
FIG. 5 is a circuit diagram of the enable interface/clock circuit 200 shown in FIG. 3.

FIG. 5 is a circuit diagram of the EI/C circuit 200.

As FIG. 5 shows, the CE signal supplied to the EI/C circuit 200 is input to a 4-input NAND circuit 201 and a selector 202. As specified above, the ECC controller 1 operates in two chip-enable modes, i.e., dynamic CE mode and static CE mode. Usually the ECC controller 1 operates in the dynamic CE mode. In the dynamic CE mode, the selector 202 outputs the CE signal input from the host 3. How the selector 202 operates in the static CE mode will be described later. A delay circuit 203 receives the signal from the selector 202 and delays it by a predetermined time. The signal thus delayed is output as CEo signal through the signal line 8. The signal (CEiN) output from the 4-input NAND circuit 201 is input to NAND circuits 207 and 215.

The WE signal input to the EI/C circuit 200 is supplied to the NAND circuit 207. The WE signal is supplied to a selector 208 and an AND circuit 221. The WE signal is also input to a delay circuit 205 and is delayed by a predetermine time. The WE signal thus delayed is output as a clock signal WECLK via a buffer 206. The signal output from the NAND circuit 207 is input to the selector 208. The selector 208 selects the WE signal in the dynamic CE mode. The signal output from the selector 208 is input to a NOR circuit 209. The NOR circuit 209 receives a mask signal MSK WE output from the control circuit 300. The signal output from the NOR circuit 209 is delayed by a delay circuit 210 by a predetermined time and input to an inverter circuit 211. The inverter circuit 211 generates a signal WEo and outputs the same. The signal WEo is output as clock signal WEoCLK via a buffer 212.

The RE signal input to the EI/C circuit 200 input to a delay circuit 213, a selector 216 and an AND circuit 221. The delay circuit 213 delays the RE signal by a predetermined time. The RE signal delayed is supplied to a buffer circuit 214 and output as a clock signal RE_CLK. The signal output from the NAND circuit 215 is input to the selector 216. The selector 216 selects the RE signal in the dynamic mode. The signal output from the selector 216 is input to a NOR circuit 217. The NOR circuit 217 receives the mask signal MSK_RE that has been output from the control signal 300. The signal output from the NOR circuit 217 is supplied to a delay circuit 218 and delayed by a predetermined time. The signal delayed is input to an inverter circuit 219. The signal output from the inverter circuit 219 is output as REo signal. The signal output from the inverter circuit 219 is output also as a clock signal REo_CLK through a buffer 220.

The signal output from the AND circuit 221 is input to a selector 222. The selector 222 selects the signal input from the AND circuit 221 or a direct clock signal (DCLK) in accordance with a control signal DCLKSEL that has been input from the control circuit 300. The signal output from the selector 222 is supplied to a delay circuit 223. The delay circuit 223 delays the signal by a predetermined time. The signal thus delayed is output as clock signal CLK through a buffer 224. The clock signal CLK is used as clock signal for the ECC controller 1.

The CLE signal input to the EI/C circuit 200 is delayed by a delay circuit 225 by a predetermined time. The signal delayed is output as CLEo signal buffer 226. The ALE signal input to the EI/C circuit 200 is delayed by a delay circuit 227 by a predetermined time and output as ALEo signal through a buffer 228.

The delay-time periods of the delay circuit 203, 205, 210, 213, 218, 223, 225 and 227 are of such values that the wiring delays in the ECC controller 1 are the same and the bus timing of the host 3 remains the same. All signals in the ECC controller 1 can thereby be delayed by the same time, though the lines provided in the ECC controller 1 to supply the signals have different lengths. Thus, the enable signals input from the host 3 are output to the NAND memory 2A, at the preserved, original timings.

Figure 6:
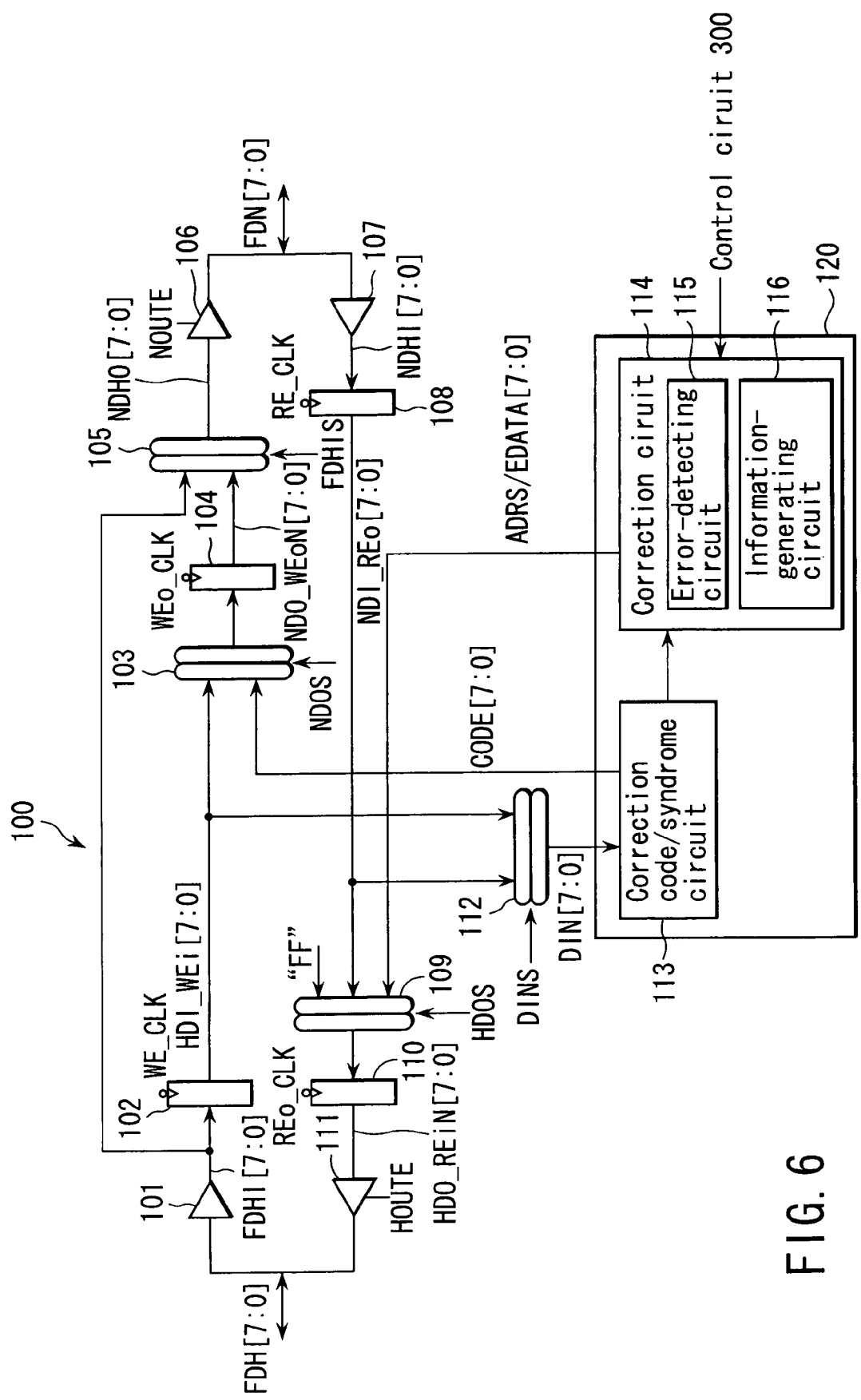
FIG. 6 is a block diagram of the data-path/ECC circuit 100 shown in FIG. 3.

FIG. 6 is a diagram illustrating the circuit configuration of the DP/ECC circuit 100.

The data supplied via the bus FDH is input to a buffer 101. The data output from the buffer 101 is input via a signal line FDHI[7:0] to a selector 105 and a flip-flop 102. The flip-flop 102 latches the input data in accordance with the clock signal WE_CLK. The data output from the flip-flop 102 is input via an 8-bit signal line HDI_WEi[7:0] to selectors 103 and 112. The selector 112 selects the data in accordance with a control signal DINS input from the control circuit 300. The data selected is supplied via an 8-bit signal line DIN[7:0] to the correction syndrome circuit 113 provided in an ECC circuit 120. The ECC circuit 120 includes the above-mentioned correction circuit 114, in addition to the correction code syndrome circuit 113. As shown in FIG. 6, the correction circuit 114 has an error-detecting circuit 115 and an information-generating circuit 116.

The correction code/syndrome circuit 113 generates an ECC code (e.g., a Reed-Solomon code) to be inserted into the write data that should be written from the host 3 to the NAND memory 2A. The ECC code generated is input to the selector 103 through an 8-bit signal line CODE[7:0]. The selector 103 inserts the ECC code into the write data in accordance with a control signal NDOS input from the control circuit 300.

The flip-flop 104 latches the input data in accordance with the clock signal WEo_CLK. The data output from the flip-flop 104 is input to the selector 105 via an 8-bit signal line NDO_WEoN[7:0]. The selector 105 selects the data on the 8-bit signal line FDHI[7:0] or the data on the 8-bit signal line NDO_WEoN[7:0] in accordance with a control signal FDHIS input from the control circuit 300. The data output from the selector 105 is input to the tri-state buffer 106 via an 8-bit signal line NDHO[7:0]. The tri-state buffer 106 outputs data in accordance with a control signal NOUTE input from the control circuit 300. The data output from the tri-state buffer 106 is output to the NAND memory 2A through the bus FDN.

Meanwhile, the read data input via the bus FDN is input to a buffer 107. Note that the buffers 101 and 107 are provided to prevent the DP/ECC circuit 100 from interacting with any external circuits. The data output from the buffer 107 is supplied via an 8-bit signal line NDHI[7:0] to a flip-flop 108. The flip-flop 108 latches the input data in accordance with the clock signal RE_CLK. The data output from the flip-flop 108 is input to selectors 109 and 112 through an 8-bit signal line NDI_REo[7:0]. The selector 112 selects the input data in accordance with the control signal DINS input from the control circuit 300. The data selected is input to the correction code/syndrome circuit 113 through the 8-bit signal line DIN [7:0].

The correction code/syndrome circuit 113 performs a syndrome operation on the read data that the host 3 is to read from the NAND memory 2A, by using an ECC code. The syndrome obtained through this syndrome operation is input to the correction circuit 114. From the syndrome, the correction circuit 114 determines whether the read data contains errors. If the read data contains no errors, the circuit 114 generates and outputs normal-end information indicating that the data has been correctly read from the NAND memory 2A.

If the read data contains errors, the correction circuit 114 corrects the read data. The correction circuit 114 generates correction-end information showing that the data has been corrected. It then outputs the correction-end information, as well as the corrected data. If five or more symbol errors are found in the read data, it is determined that the read data cannot be corrected. In this case, the correction circuit 114 generates and outputs abnormal-end information that indicates that errors cannot be corrected.

The data output from the correction circuit 114 is input to the selector 109 through an 8-bit signal line ADRS/EDATA [7:0]. The selector 109 outputs the data selected in accordance with a control signal HDOS input from the control circuit 300. The data output from the selector 109 is input to a flip-flop 110. The flip-flop 110 latches the data by using the clock signal REo_CLK. The data output from the flip-flop 110 is input to a tri-state buffer 111 through an 8-bit signal line HDO_REiN[7:0]. The tri-state buffer 111 outputs the data in accordance with a control signal HOUTE input from the control circuit 300. The data output from the tri-stage buffer 111 is output through the bus FDH.

Figure 7:
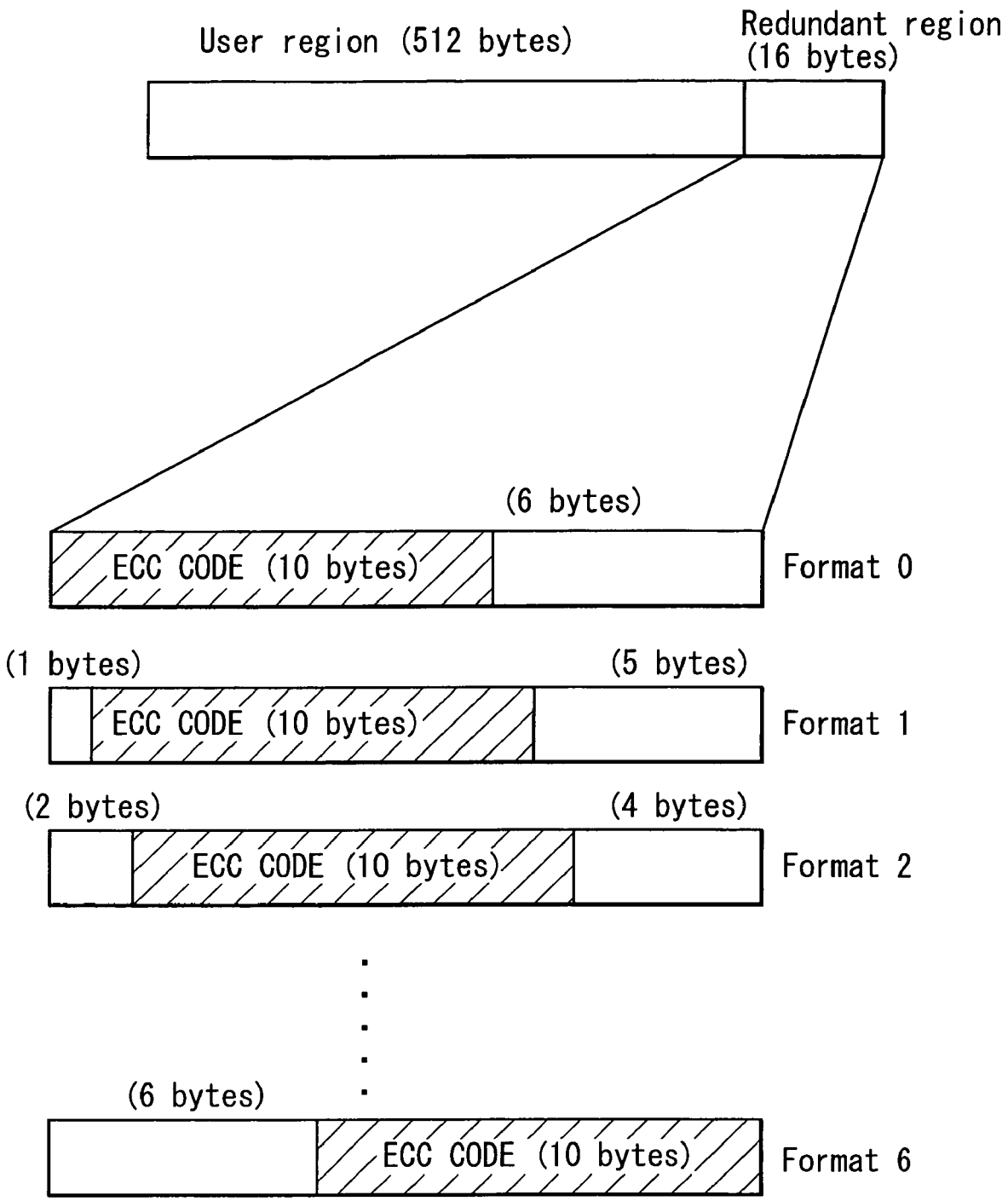
FIG. 7 is a diagram representing the format of the block data used in the embodiment.

FIG. 7 is a diagram that represents the format of the data block used in the embodiment. In this embodiment, data is processed in units of blocks each having a predetermined number of bytes. Each data block consists of, for example, 528 bytes. Each data block is composed of a 512-byte user region and a 16-byte redundant region. A 16M-byte memory card, for example, has 32K data blocks of this type. The ECC encoding system utilizes, for example, Reed-Solomon codes and performs 4-symbol error correction (each symbol consists of 10 bits). The ECC encoding system generates an 8-symbol (80-bit) ECC code for the 512-byte data stored in each user region. That is, the ECC code is a 10-byte code.

As is illustrated in FIG. 7, the format 0 is so designed that an ECC code is inserted immediately after the user region. The format 1 has a 1-byte redundant region that follows the user region and an ECC code that is inserted after the 1-byte redundant region. The format 2 has a 2-byte redundant region that follows the user region and an ECC code that is inserted after the 2-byte redundant region. The format 3 has a 3-byte redundant region that follows the user region and an ECC code that is inserted after the 3-byte redundant region. The format 4 has a 4-byte redundant region that follows the user region and an ECC code that is inserted after the 4-byte redundant region. The format 5 has a 5-byte redundant region that follows the user region and an ECC code that is inserted after the 5-byte redundant region. The format 6 has a 6-byte redundant region that follows the user region and an ECC code that is inserted after the 6-byte redundant region.

In the format 6, the 6-byte redundant region may be assigned to the 512-byte user region. In this case, a 10-byte ECC is generated for the 518 bytes that should be protected, i.e., the sum of 512 bytes (user region) and 6 bytes (redundant region). Thus, 518 bytes can be used as user region. To select one of the formats and the data (512 bytes or 518 bytes) to be protected, the host 3 has written into a mode register incorporated in, for example, I/O register 500. This embodiment uses the format 6 in which 518 bytes are the data that should be protected.

How the ECC controller 1 configured as specified above operates will be described below.

Figure 8:
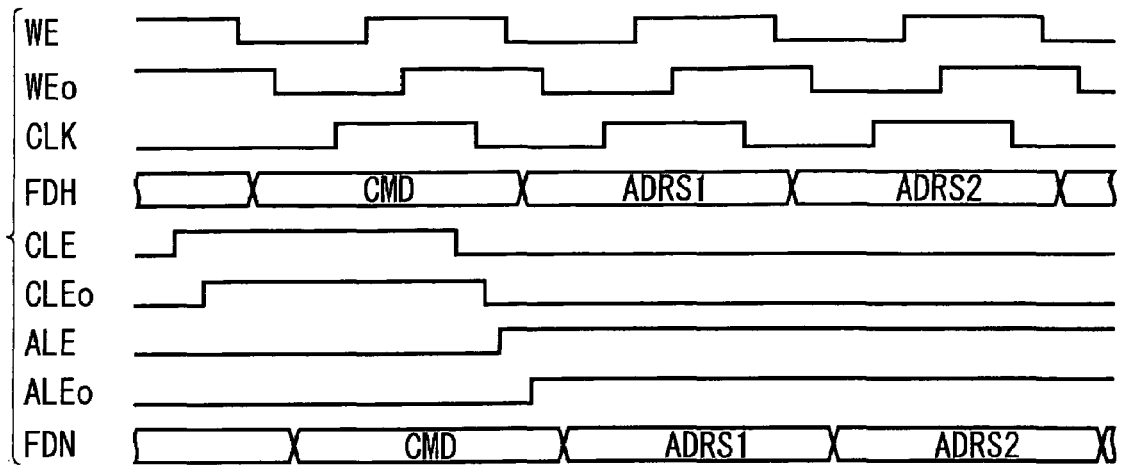
FIG. 8 is a timing chart explaining how commands and addresses are output from the ECC controller shown in FIG. 3.

First, it will be described how the host 3 outputs commands and addresses. FIG. 8 is a timing chart explaining how the commands and addresses are output.

The host 3 sets the WE signal and the CLE signal at low level and high level, respectively, thus rendering them active, in order to transfer a command CMD (e.g., block-write command) to the NAND memory 2A. The host 3 then outputs the command CMD to the bus FDH. In response to the command CMD, the EI/C circuit 200 outputs the WEo signal and CLEO signal to the NAND memory 2A. The DP/ECC circuit 100 outputs the command CMD to the bus FDN, without latching the command CMD. To be more specific, the command/address output circuit 302 generates a control signal FDHIS for selecting the data on the signal line FDHI and supplies this signal FDHIS to the control terminal of the selector 105. The NAND memory 2A reads the command CMD at the leading edge of the WEo signal. Each of the data items, which will be described later, is read into the NAND memory 2A in the same way as the command CMD.

Next, the host 3 sets the WE signal and the CLE signal at high level and outputs addresses (ADRS1 and ADRS2) to the bus FDH. The EI/C circuit 200 then outputs an ALEo signal to the NAND memory 2A. Further, the DP/ECC circuit 100 outputs the addresses ADRS1 and ADRS2 to the bus FDN, without latching these addresses. This makes it possible to write data into the NAND memory 2A. To read data from the NAND memory 2A, the same sequence of operations is carried out. In the present embodiment, four bytes are assigned to addresses (ADRS1 to ADRS4) and the command CMD and each of the addresses ADRS1 to ADRS4 consist of one byte.

Figure 9:
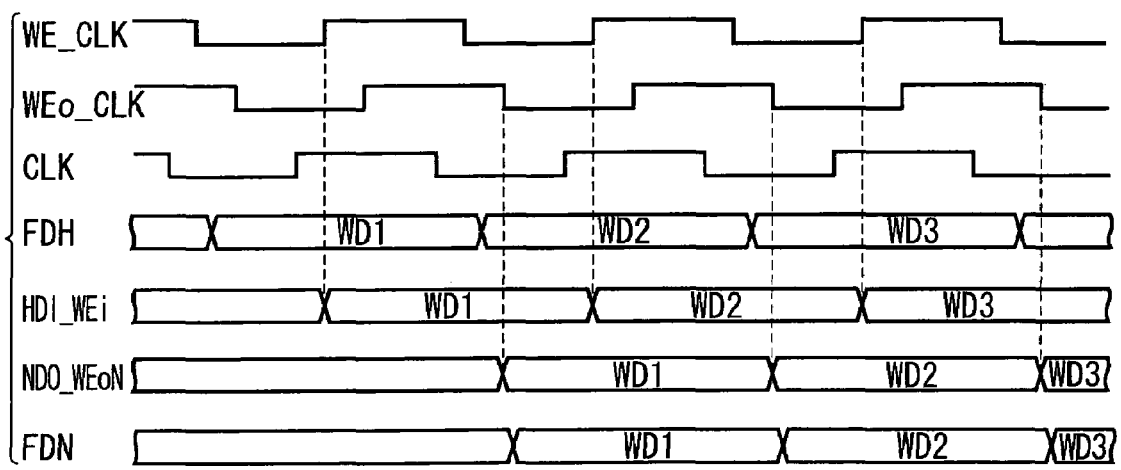
FIG. 9 is a timing chart explaining how the ECC controller 1 shown in FIG. 3 operates to write data.

How data is written into the NAND memory 2A will be described with reference to FIG. 9. FIG. 9 is a timing chart explaining how to write data.

When the host 3 outputs write data WD1 (1-byte data), the ECC controller 1 input the write data WD1 to the DP/ECC circuit 100. The DP/ECC circuit 100 latches the write data WD1 at the leading edge of the clock signal WE_CLK and outputs the same to the 8-bit signal line HDI_WEi[7:0]. Each write data item is thus synchronized with the clock signal WE_CLK. This renders it easy to design the synchronization system of the control circuit 300.

Next, the DP/ECC circuit 100 latches the write data WD1 at the leading edge of the clock signal WEo_CLK and output the write data WD1 to the 8-bit signal line NDO_WEoN[7:0]. Since each write data item is thus latched by using the clock signal WEo_CLK, the wiring delay in the ECC controller 1 need not be taken into account. This makes it easy to devise the layout of the ECC controller 1. The ECC controller 1 outputs the write data WD1 to the NAND memory 2A via the bus FDN. Write data WD2 and write data WD3, which follow the write data WD1, are processed in the same way as the write data WD1.

The ECC controller 1 can output the write data via an 8-bit signal line FDHI[7:0], without latching the write data. If this is the case, the data-writing circuit 303 generates a control signal FDHIS and inputs this signal FDHIS to the selector 105. The control signal FDHIS selects the data to be transferred via the signal line FDHI. Hence, the write data output from the host 3 is supplied to the NAND memory 2A, without being latched.

Figure 10:
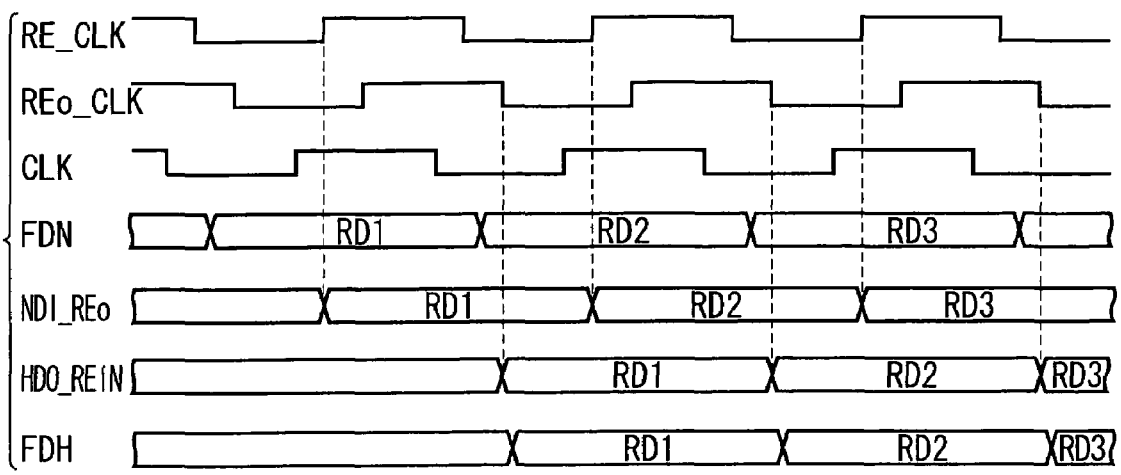
FIG. 10 is a timing chart explaining how the ECC controller 1 shown in FIG. 3 operates to read data.

How data is read from the NAND memory 2A will be described, with reference to FIG. 10. FIG. 10 is a timing chart illustrating how the data is read.

When the NAND memory 2A outputs read data RD1 (1-byte data) to the bus FDN, the ECC controller 1 inputs the read data RD1 to the DP/ECC circuit 100. The DP/ECC circuit 100 latches the read data RD1 at the leading edge of the clock signal RE_CLK and outputs the read data RD1 to the 8-bit signal line NDI_REo[7:0]. Next, the DP/ECC circuit 100 latches the read data RD1 at the leading edge of the clock signal REo_CLK and outputs the read data RD1 to the signal line HDO_REiN[7:0]. The ECC controller 1 outputs the read data RD1 to the host 3 through the bus FDH. The ECC controller 1 performs the same process on read data RD2a and read data RD3 that follow the read data RD1.

If the ECC controller 1 does not latch any read data before it outputs the read data, the setup margin required when the host 3 reads the data will decrease. The latching of the read data in the ECC controller 1 therefore effectively avoids such a decrease of the setup margin. If the EEC controller 1 latches the read day in order to provide an ample setup margin, the read data will be output to the host 3 with a one-cycle delay with respect to the RE signal output from the host 3 as is illustrated in FIG. 10. In this case, the host 3 is informed beforehand that the read data will not be supplied to the host 3 if the first RE signal is active.

Figure 11:
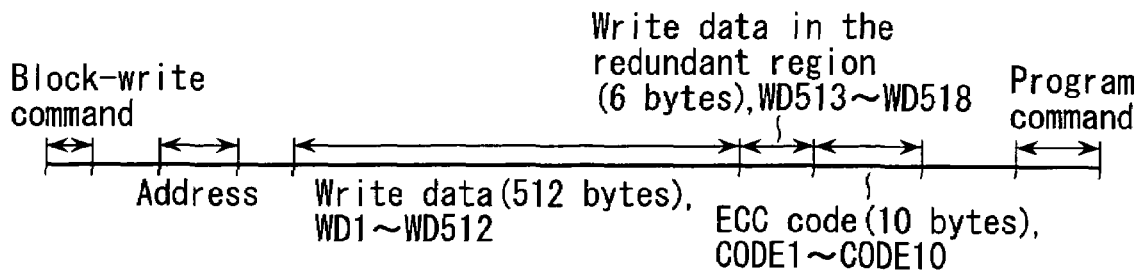
FIG. 11 is a diagram showing how the ECC controller 1 shown in FIG. 3 operates to write block write data.
Figure 12:
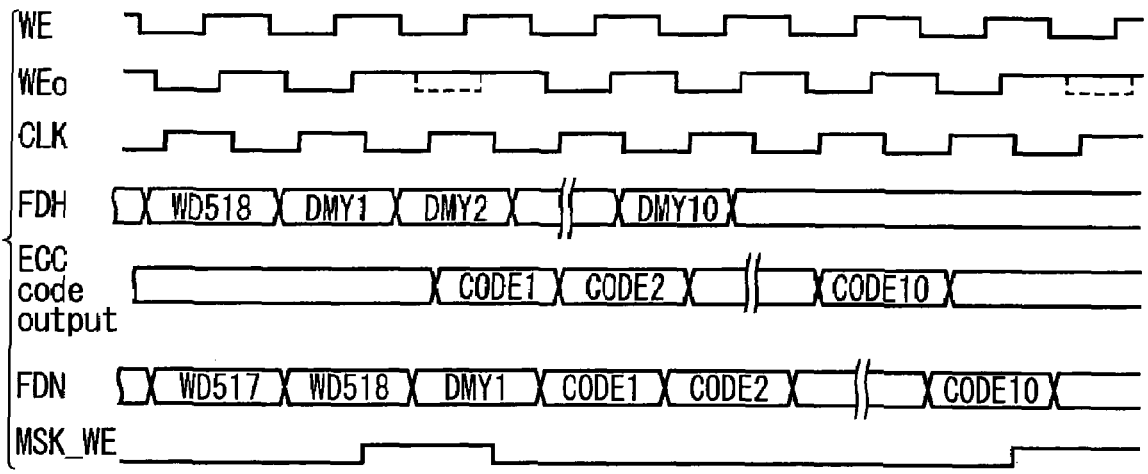
FIG. 12 is a timing chart explaining how block write data is written by the ECC controller 1 shown in FIG. 3.

It will be described how to write data that is composed of data block of the format 6 in which the data to be protected consists of 518 bytes. FIG. 11 is a diagram indicating the sequence of writing the above-mentioned write data. FIG. 12 is a timing chart that explains how the write data is written.

Assume that the host 3 executes a block-write command to write the write data. Then, the data-writing circuit 303 detects the block-write command and starts performing the process of writing the write data. For example, the counter 400 starts counting the bytes of the write data items WD1 to WD518 (write data items WD1 to WD512 and write data items WD513 to WD518 in the redundant region), upon detecting the block-write command. The write data items WD1 to WD518 input from the bus FDH are latched by using the clock signal WE_CLK. The data-writing circuit 303 generates a control signal NDOS that selects the write data items WD1 to WD518. The control signal NDOS is input to the control terminal of the selector 103. The data-writing circuit 303 generates a control signal DINS, too, which selects the write data items WD1 to WD518. The control signal DINS is input to the control terminal of the selector 112.

The correction code/syndrome circuit 113 generates an ECC code (consisting of 10 bytes) for the write data items WD1 to WD518 input from the selector 112. The host 3 outputs dummy write data items DMY1 to DMY 10 after it outputs the data that is to be protected. The dummy writ data items DMY1 to DMY 10 can be of any type. The data-writing circuit 303 generates a control signal DOS. The control signal DOS is input the selector 103. Controlled by this signal DOS, the selector 103 outputs ECC codes CODE1 to CODE 10, instead of the dummy write data items DMY1 to DNY 10.

The DP/ECC circuit 100 latches the data block containing the ECC codes output from the selector 103, by using the clock signal WEo_CLK. At this time the data-writing circuit 303 generates a masking signal MSK_WE (at high level) and input the masking signal to the NOR circuit 209 in order to mask, for a one-pulse period, the WE signal immediately following the write data item WD 518. The timing of masking the WE signal is determined from the count value of the counter 400. Thus, the dummy write data item DMY 1 is not written into the NAND memory 2A.

The data-writing circuit 303 generates a control signal FDHIS, which will select the write data and the ECC codes, which have been latched. The control signal FDHIS is input to the control terminal of the selector 105. The ECC controller 1 transfers the data items from the selector 105, one after another, to the NAND memory 2A.

The host 3 executes the program command, rendering the CLE signal and the WE signal active. Note that the data buffer of the NAND memory 2A stores the data input from the ECC controller 1. When the host 3 executes the program command, the data in the data buffer is written into the memory cells of the NAND memory 2A. Then, the host 3 executes a status-read command to detect the status of the NAND memory 2A, performing the polling of the R/B signal. When it is detected that the status-read signal becomes ready, the host 3 finishes writing the write data and execute, if necessary, the next block-write command.

Figure 13:
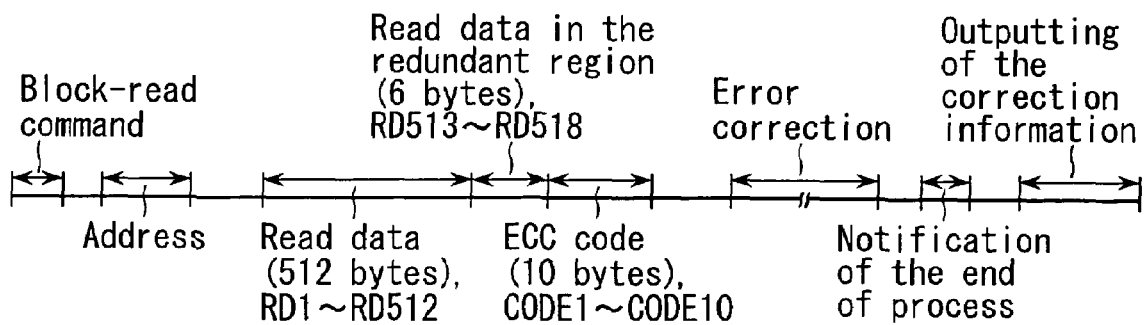
FIG. 13 is a diagram indicating how the ECC controller 1 shown in FIG. 3 operates to read block read data.

It will be described how the read data is read from the NAND memory 2A. FIG. 13 is a diagram that explains how the above-mentioned read data is read out.

Assume that the host 3 executes the block-read command to read the read data from the NAND memory 2A. Then, the ECC controller 1 detects the block-read command on the bus FDN and starts the data-reading process. At the same time, the ECC controller 1 outputs the block-read command to the NAND memory 2A. Then, the ECC controller 1 supplies to the NAND memory 2A the address that the host 3 has output. The host 3 performs the polling of the R/B signal and starts transferring the read data from the NAND memory 2A upon detecting that the NAND memory 2A is ready.

The DP/ECC circuit 100 latches the 528-byte read data (read data items RD1 to RD512, read data items RD513 to RD518 in the redundant region, and ECC codes CODE1 to CODE10), by using the clock signal RE_CLK. The data-reading circuit 304 generates a control signal HDOS to select the read data. The control signal HDOS is input to the control terminal of the selector 109. The data-reading circuit 304 generates a control signal DINS, too, to select the read data latched as described above. This control signal DINS is input to the control terminal of the selector 112.

The correction code/syndrome circuit 113 generates a syndrome signal from the ECC codes CODE1 to CODE10, for the read data items RD1 to RD518 input from the selector 112. The error-detecting circuit 115 determines whether the data contains erroneous data items, in accordance with the syndrome signal. If no erroneous data items are detected, the information-generating circuit 116 generates the normal-end information. In this case, the correction circuit 114 outputs the normal-end information as a notification of the end of process. The data-reading circuit 304 generates a control signal HDOS to select the normal-end information. The control signal HDOS is input to the control terminal of the selector 112.

If any erroneous data is detected, the correction circuit 114 performs error correction. More precisely, if the error-detecting circuit 115 detects erroneous data, the information-generating circuit 116 generates correction information that consists of the address of the error data and the error-difference data for correcting the erroneous data. The error-difference data is data that is exclusively ORed with the read data read by the host 3 to provide a desired value (i.e., data free of errors).

When the erroneous data is corrected, the information-generating circuit 116 generates correction-end information. The correction circuit 114 outputs the correction-end information and the correction information. The data-reading circuit 304 generates a control signal HDOS to select the correction-end information and the correction information. The control signal HDOS is input to the control terminal of the selector 109. The information-generating circuit 116 generates error presence/absence data and error-number data. The error presence/absence data indicates whether the data contains erroneous data items. The error-number data represents the number of erroneous data items, if any, contained in the data. The correction information that the correction circuit 114 outputs may contain the error presence/absence data and the error-number data.

The correction circuit 114 determines that the error correction is impossible if five or more symbols of data are found erroneous. More specifically, if the error-detecting circuit 115 detects erroneous data items, it determines whether five or more symbols are erroneous. If the error-detecting circuit 115 determines that five or more symbols are erroneous, the information-generating circuit 116 generates the abnormal-end information. Note that the critical number of erroneous symbols, i.e., five, may be changed to any other number. The abnormal-end information generated is output from the correction circuit 114. The data-reading circuit 304 generates a control signal HDOS for selecting the abnormal-end information. This control signal HDOS is input to the control terminal of the selector 109.

The DP/ECC circuit 100 latches the data items output from the selector 109, by using the clock signal REo_CLK. The ECC controller 1 outputs the read data and various information items to the host 3. The ECC controller 1 performs the following process of reading the read data.

How the clock-generating circuit 305 operates in the substituted WE/RE clock mode will be explained.

If the NAND memory 2A is a memory card that uses a bus protocol utilizing no clock signal DCLK, no clock signal DCLK is available to drive the ECC controller 1. Note that the clock signal DCLK is a signal that can be obtained from the data input from the host 3 or a signal input directly from the host 3. Therefore, the clock-generating circuit 305 operates in the substituted WE/RE clock mode in the ECC controller 1. To switch the operating mode to the substituted WE/RE clock mode, the user may operate the host 3 or an external input means. The ECC controller 1 may have the function of detecting memory cards have no clock signals. In this case, the operating mode is automatically switched to the substituted WE/RE clock mode. In the substituted WE/RE clock mode, the host 3 outputs a WE signal or a RE signal even while it is not writing or reading data, so that processes can be carried out in the ECC controller 1.

In the substituted WE/RE clock mode, the clock-generating circuit 305 generates a control signal DCLKSEL to select the AND signal, which has been generated from the WE signal and the RE signal and which is to be used as clock signal CLK. The control signal DCLKSEL is input to the control terminal of the selector 222. The controller 1 can therefore use the AND signal as clock signal CLK. The ECC controller 1 activates the counter 400 when it detects that a block-write command and an address, for example, are input from the host 3. At this time, the counter 400 starts counting the pulses of the WE signal.

Upon detecting that the count of the counter 400 reaches a prescribed value based on the data format (i.e., 528 in this embodiment because each data block consists of 528 bytes), the clock-generating circuit 305 generates a mask signal MSK_WE (at high level) to mask the pulses. The mask signal MSK_WE is input to NOR circuit 209. The WEo signal output via the NOR circuit 209 is therefore masked at a precise timing. To write one block of write data into the NAND memory 2A, for example, 528 pulses of the WE signal are output to mask the next WE signal. The RE signal can be masked in the same way as the WE signal.

Thus, any WE signal or any RE signal that is unnecessary for the NAND memory 2A are masked even if the host 3 outputs such a WE or RE signal to make the ECC controller 1 perform processes. This prevents the NAND memory 2A from malfunctioning.

How the CE-generating circuit 306 operates in the static CE mode will be explained. Assume that the ECC controller 1 controls four NAND memories 2A to 2D. If the host 3 can allocate four chip enable (CE) signals to the NAND memories 2A to 2D, respectively, the CE-generating circuit 306 is operated in the dynamic CE mode that is the ordinary operating mode. In the dynamic CE mode, the ECC controller 1 outputs the CE[3:0] signal input from the host 3 to the NAND memory designated. In this NAND memory, the CE [3:0] signal is used as CEo [3:0] signal. Note that the CE [3:0] signal is a 4-bit signal and can control the four memories at the same time in the present embodiment.

The host 3 may make only one CE signal active for the NAND flash memory module 2 and only one CE signal may be allocated to the four NAND memories 2A to 2D. In this case, the ECC controller 1 operates in the static CE mode to control the four NAND memories 2A to 2D.

The ECC controller 1 usually outputs the CE signal supplied from the host 3, as CEo signal, to the NAND memory 2A. Once the host 3 has set a mode register 501, however, the ECC controller 1 operates in the static CE mode. In the static CE mode, the ECC controller 1 outputs the data held in the static CE register, as a CEo signal.

The page-data program period of the NAND memory 2A (i.e., the time required to write data from the data buffer to memory cells in the memory 2A,) is several milliseconds. The page-data read-busy period (i.e., the time required to write data from the memory cells to data buffer in the memory 2A) is hundreds of microseconds. If the CE signal supplied to the NAND memory 2A remains active throughout the page-data program period or the page-data read-busy period, the host 3 cannot access any peripheral device on the host bus. The data-processing efficiency of the whole system will inevitably fail. To prevent this, the host 3 sets the ECC controller 1 in the static CE mode.

Once the host 3 has set the ECC controller 1 in the static CE mode, the CE-generating circuit 306 inputs the static CE signal held in a static CE register 502, to the selector 202. The CE-generating circuit 306 generates static CE-selection signal (STATIC_CE_MODE) and inputs the same to the control terminals of the selectors 202, 208 and 216. The selector 202 outputs the static CE signal. The static CE signal is output, as CEo signal, to the NAND memory 2A. Thus, the host 3 holds the CE signal supplied to the NAND memory 2A, in active state. The host 3 therefore renders the CE signal being supplied through the host bus to the NAND memory 2A, while maintaining page-data programming state and page-data read-busy state. Hence, the host 3 can make the CE signals active, which are being supplied to the other peripheral devices.

The ECC controller 1 has a circuit that masks the WEo or CE signal (4 bits) if the signal is not active in the static CE mode. Hence, the CEo signal is active only while the NAND memory 2A remains busy, irrespectively of the level of the external CE signal, but it is possible to prohibit access to the NAND memory 2A by virtue of the REo or WE signal.

The selector 208 selects the signal output from the NAND circuit 207 when it receives a STATIC_CE_MODE signal. The selector 216 selects the signal output from the NAND circuit 215 when it receives the STATIC_CE_MODE signal. The WEo and REo signals are masked in accordance with the CE[3.0] signal in the static CE mode when the output signal of the 4-input NAND circuit 201 is input to the NAND circuits 207 and 215. That is, if all four bits of the CE[3.0] signal are at high level, the signal output from the NAND circuit 201 is at low level and the signals output from the NAND circuits 207 and 217 are at high level regardless of the levels of the WE and RE signals. Thus, as long as the CE signal remains inactive, no data is written into or read from the NAND memory 2A.

As specified above, the ECC controller 1 has the interruption circuit 307. How the interruption circuit 307 performs an interruption process will be explained. The interruption circuit 307 renders the interruption (INTN) signal active, thus informing the host 3 of Interruption.

When the read data is read, in its entirety, from the NAND memory 2A to the host 3, the error-information output circuit 308 inputs data "ff" (hexadecimal notation) to the selector 109. This data "ff" indicates that the ECC controller 1 is detecting errors. The interruption circuit 307 generates a control signal HDOS to select the data "ff". The control signal HDOS is input to the control terminal of the selector 109. The data "ff" is thereby output to the host 3. From the data "ff," the host 3 determines that the ECC controller 1 is detecting errors. The data "ff" may be replaced by any data that indicates that the ECC controller 1 is detecting errors.

Upon lapse of a prescribed cycle (the sum of the high- and low-level periods of the RE signal), the error-information output circuit 308 outputs one cycle of the error presence/absence data to the host 3 and then keeps outputting the data "ff" to the host 3. Next, the error-information output circuit 308 outputs one cycle of the error-number data to the host 3 and then keeps outputting the data "ff" to the host 3.

After the prescribed period, the error-information output circuit 308 outputs the normal-end information, correction-end information, or abnormal-end information in accordance with the result of the correction process. These items of information output from the error-information output circuit 308 are generated by the correction circuit 114, as mentioned above. The error-information output circuit 308 controls the correction circuit 114, causing the same to output the various items of information at the timings specified above. The interruption circuit 307 outputs data when the interruption circuit 307 generates and inputs the control signal HDOS to the control terminal of the selector 109. The interruption circuit 307 outputs any other data in the same way.

When the correction process ends in non-interruption mode, it is stopped if the normal-end information is available. If the correction-end information is available, the error-information output circuit 308 outputs the correction information to the host 3 and stops operating. If the abnormal-end information is available, the error-information output circuit 308 stops operating, too.

Assume that the correction process ends in the interruption mode. Then, the interruption circuit 307 makes the interruption signal (INTN) active if the normal-end information is available. Then, the interruption circuit 307 keeps outputting the normal-end information to the bus FDN. Upon receipt of the interruption signal, the host 3 acquires the interruption contents and outputs an acknowledge command, or interruption-enable signal, to the ECC controller 1. The interruption circuit 307 masks the acknowledge command, not outputting this command to the NAND memory 2A. The acknowledge command is generated when the interruption circuit 307 generates and inputs a mask signal MSK_WE (at high level) to the NOR circuit 209. Upon receipt of the acknowledge command, the interruption circuit 307 renders the INTN signal active and stops operating.

If the correction-end information is available, the interruption circuit 307 renders the INTN signal inactive when it receives the acknowledge command. In this case, the error-information output circuit 308 outputs the correction information in synchronism with the RE signal and stop operating.

If the abnormal-end information is available, the interruption circuit 307 renders the INTN signal inactive upon receipt of the acknowledge command and stops operating. This interruption process enables the host 3 to acquire the interruption contents at the same time it is informed of the interruption. This makes it unnecessary to access the I/O register 500 in order to supply the interruption contents to the host 3.

It will be described how the ECC-region changing circuit 309 changes the ECC-code storage region.

The ECC controller 1 has the function of designating any position in the redundant region of the block data format (FIG. 7), at which the ECC code should be inserted. To select the format, the host 3 may set in the ECC controller 1 the format information selected by the user. For the same purpose, the ECC controller 1 may have an input means and the user may operate the input means to set the format information in the ECC controller 1.

Assume that the host 3 writes the format information into the mode register 501 incorporated in the ECC controller 1. Then, the ECC-region changing circuit 309 sequentially inserts the bytes of the ECC code generated by the correction code/syndrome circuit 113, when the count value of the counter 400 reaches the value determined for the format selected. The format selected may be the format 1 shown in FIG. 7. In this case, the ECC-region changing circuit 309 generates a control signal NDOS when the count value increases to 513. The control signal NDOS, which selects the ECC code output from the correction code/syndrome circuit 113, is input to the control terminal of the selector 103. The ECC code can therefore be inserted at the position prescribed for the format 1.

It will be described how the dedicated-command circuit 310 operates so that the ECC controller 1 may execute a dedicated-command.

Of the codes of the command set in the memory card, those not used yet must be assigned as the dedicated-commands of the ECC controller 1. If so, the number of dedicated-commands is limited. This disables the ECC controller 1 from performing as many functions as desired. In the present embodiment, only two dedicated-commands are used and the ECC controller 1 performs various functions dedicated to it.

Commands 90 (CMD90) and 91 (CMD91) are defined as commands dedicated to the ECC controller 1. When the host 3 executes the CMD 90, the ECC controller 1 starts operating in a dedicated-command execution mode. When the host 3 executes the CMD91, the ECC controller 1 stops operating in the dedicated-command execution mode. While operating in the dedicated-command execution mode, the ECC controller 1 masks the command input from the host 3, not outputting the command to the NAND memory 2A.

More specifically, the dedicated-command circuit 310 generates a mask signal MSK_WE (at high level). The mask signal MSK_WE is input to the NOR circuit 209. The WEo signal output to the NAND memory 2A therefore becomes inactive, irrespective of the level of the WE signal output from the host 3. The dedicated-command circuit 310 generates a mask signal MSK_RE (at high level), too. This mask signal MSK_RE is input to the NOR circuit 217. Thus, the REo signal output to the NAND memory 2A becomes inactive, regardless of the level of the RE signal output from the host 3. Hence, no commands are written into the NAND memory 2A once the CMD 90 has been executed.

Once the host 3 executes the CMD 90, it can cause the ECC controller 1 to execute commands, by using codes identical to those of the set stored in the memory card. That is, many commands dedicated to the ECC controller 1 can be defined to enable the ECC controller 1 to perform many functions.

As described in detail, this embodiment is of such architecture that the ECC controller 1 is provided on the bus that connects the host 3 and the NAND memory 2A. Neither the host 3 nor the NAND memory 2A needs to be re-designed when additional ECC circuits are used in order to process, for example, multi-level data.

The ECC controller 1 latches write data in accordance with the WE signal input to it from the host 3. This makes it unnecessary for the control circuit 300 to synchronize the write data. Thus, it is easy to design the data synchronization system. In the ECC controller 1, the delay circuits make the line delays equal. Various enable signals can therefore be supplied to the NAND memory 2A at the preserved, original timings. The WEo signal appropriately delayed is used, latching the write data before the ECC controller 1 outputs the write data. The host 3 and the NAND memory 2A can therefore have a setup margin that is required when the host 3 and the memory 2A receive data. The ECC controller 1 can latch the data input from the host 3 or allow the passage of the data to the NAND memory 2A, in accordance with the type of the data.

The ECC controller 1 may be applied to a bus protocol provided in a memory card that has no clock generators. Even in this case, the write enable signal or the read enable signal can be used as a clock generator. The ECC controller 1 can therefore be added to the system having no clock generators. Since only the write enable signal and read enable signal that are necessary to the memory card are output to the memory card, no other write or read enable signals that are unnecessary are not input to the memory card. This prevents the memory card from malfunctioning.

In the system, the host 3 can assert only one chip enable signal to, for example, an I/O device. Instead, the ECC controller 1 can make the chip enable signal active. Once the chip enable signal to the NAND memory 2A is thus made active, the host 3 can access any other device to accomplish parallel processes.

The ECC controller 1 has the function of rendering the interruption signal active and, at the same time, continuously outputting the interruption contents to the bus. In other words, the ECC controller 1 can inform the host 3 of the interruption and the interruption contents at the same time. This makes it unnecessary for the host 3 to access to the I/O register 500 that is provided in the NAND memory 2A. As a result, the processes that the host 3 performs are simplified and can be carried out at high speed.

Further, the ECC controller 1 has the function of changing the region in which the ECC code is inserted. This makes it possible for the NAND memory 2A to store data in many types of formats.

Still further, the ECC controller 1 has the function of masking the dedicated-command input from the host 3, not supplying this command to the NAND memory 2A. This enables the host 3 to execute commands, by using codes identical to those of the set stored in the NAND memory 2A. Many commands dedicated to the ECC controller 1 can be defined so that the ECC controller 1 may perform a number of functions.

The embodiment described above has an ECC controller 1, in addition to the host 3 and the NAND memory 2A. Nonetheless, the host 3 may incorporate the ECC controller 1. Alternatively, the NAND memory 2A may incorporate the ECC controller 1. In either case, the ECC controller 1 operates in the same manner as described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ECC (Error Check and Correct) control apparatus to be connected between a host and a memory, comprising:
    a data-path circuit which inputs and outputs data to and from the host, and inputs and outputs data to and from the memory;
    an enable interface circuit which receives, from the host, a write-enable signal indicating that data is being written to the memory, and outputs the write-enable signal to the memory;
    a detecting circuit which detects a protected-data region and a redundant region of write data input from the host and having a predetermined data length;
    a code-generating circuit which generates an error-correction code for correcting errors in data of the protected-data region;
    a code-inserting circuit which inserts the error-correction code in the redundant region; and
    a counter which counts pulses that constitute the write-enable signal,
    wherein the data-path circuit outputs the write data to the memory in synchronization with a first clock signal generated from the write-enable signal, and
    the enable interface circuit masks the write-enable signal when a number of counted pulses reaches a prescribed number based on data items of the write data.

2. The ECC control apparatus according to claim 1, wherein the counter which counts data items of the write data, and the detecting circuit detects the protected-data region and redundant region of the write data in accordance with a count value obtained by the counter.

3. The ECC control apparatus according to claim 2, wherein the detecting circuit detects a specified part of the redundant region, the code-generating circuit generates an error-correction code for correcting errors in the data of the protected-data region and the data of those parts of the redundant region which precede the specified part, and the code-inserting circuit inserts the error-correction code in the specified part of the redundant region.

4. The ECC control apparatus according to claim 3, further comprising a syndrome circuit which performs an syndrome operation on a read data input from the memory and having the predetermined data length, by using the error-correction code contained in the read data, and which generates a syndrome signal, and an error-correcting circuit which corrects errors in accordance with the syndrome signal.

5. The ECC control apparatus according to claim 4, wherein the error-correcting circuit comprises an error-presence/absence determining circuit which determines whether the read data contains errors, and an error-information generating circuit which generates correction information for correcting errors, when the error-presence/absence determining circuit determines that the read data contains errors.

6. The ECC control apparatus according to claim 5, wherein the error-presence/absence determining circuit determines whether the number of erroneous data items has exceeded a predetermined value, when the error-presence/absence determining circuit determines that the read data contains errors, and the error-information generating circuit generates abnormal-end information indicating that it is impossible to correct the read data, when the error-presence/absence determining circuit determines that the number of erroneous data items has exceeded the predetermined value.

7. The ECC control apparatus according to claim 5, wherein the error-information generating circuit generates normal-end information when the error-presence/absence determining circuit determines that the read data contains no errors.

8. The ECC control apparatus according to claim 6, in which the error-information generating circuit generates correction-end information when the error-presence/absence determining circuit determines that the number of erroneous data items has not exceeded the predetermined value, and which further comprises an interruption circuit which generates and supplies an interruption signal to the host to interrupt the host and an information output circuit which outputs the normal-end information or the abnormal-end information to the host when the interruption circuit supplies the interruption signal to the host.

9. The ECC control apparatus according to claim 1, wherein the counter starts counting the pulses after the data-path circuit receives an address signal that represents the address of the write data.

10. The ECC control apparatus according to claim 1, further comprising a register which registers a dummy chip-enable signal identical to a chip-enable signal indicating that the host is accessing the memory, and a chip-enable signal generating circuit which operates in a first mode to output to the memory the chip-enable signal received from the host and in a second mode to output the dummy chip-enable signal to the memory, thereby to supply the chip-enable signal or the dummy chip-enable signal to the memory by switching the first and second modes from one to the other.

11. The ECC control apparatus according to claim 1, which further comprises a region-changing circuit which changes that part of the redundant region which is provided to store the error-correction code, and in which the code-inserting circuit inserts the error-correction code in that part of the redundant region which has been changed by the region-changing circuit.

12. The ECC control apparatus according to claim 1, further comprising a dedicated command circuit which performs a control not to output to the memory a command input from the host, once after a first command has been output from the host.

13. The ECC control apparatus according to claim 12, wherein the dedicated command circuit performs a control to output to the memory the command input from the host, once after a second command is input from the host.

14. The ECC control apparatus according to claim 12, wherein the dedicated command circuit masks the write-enable signal input from the host, thereby not to write the command into the memory.

15. The ECC control apparatus according to claim 1, wherein the memory is a NAND flash memory.

16. The ECC control apparatus according to claim 1, wherein the data-path circuit outputs, to the host, read data input from the memory in synchronization with a second clock signal generated from a read-enable signal which is input from the host and indicates that data is being read from the memory.

17. The ECC control apparatus according to claim 16, further comprising:
the counter which counts pulses that constitute the read-enable signal,
wherein the enable interface circuit masks the read-enable signal when the number of counted pulses reaches a prescribed number based on the data items of the read data.

18. The ECC control apparatus according to claim 16, further comprising:
a plurality of delay-adjusting circuits which adjust delay times of control signals input from the host in accordance with wiring delays of the apparatus, the control signals including the read-enable signal; and
a clock circuit which generates the second clock signal from the read-enable signal adjusted by the delay-adjusting circuits.

19. The ECC control apparatus according to claim 16, wherein the data-path circuit includes a latch circuit which latches the read data in accordance with the second clock signal.

20. The ECC control apparatus according to claim 1, further comprising:
a plurality of delay-adjusting circuits which adjust delay times of control signals input from the host in accordance with wiring delays of the apparatus, the control signals including the write-enable signal; and
a clock circuit which generates the first clock signal from the write-enable signal adjusted by the delay-adjusting circuits.

21. The ECC control apparatus according to claim 1, wherein the data-path circuit includes a latch circuit which latches the write data in accordance with the first clock signal.

22. The ECC control apparatus according to claim 1, further comprising:
a clock circuit which generates a second clock signal from the write-enable signal or a read-enable signal which is input from the host and indicates that data is being read from the memory,
wherein the code-generating circuit operates in synchronization with the second clock signal.

* * * * *